United States Patent
Lee et al.

(10) Patent No.: US 8,135,087 B2
(45) Date of Patent: Mar. 13, 2012

(54) APPARATUS AND METHOD FOR SIGNAL DETECTION USING LOG LIKELIHOOD RATIO

(75) Inventors: Young Ha Lee, Daejeon (KR); Seungjae Bahng, Daejeon (KR); Kyung Yeol Sohn, Daejeon (KR); Youn Ok Park, Daejeon (KR)

(73) Assignees: Electronics and Telecommunications Research Institute, Daejon (KR); Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 12/629,376

(22) Filed: Dec. 2, 2009

(65) Prior Publication Data
US 2010/0142656 A1    Jun. 10, 2010

(30) Foreign Application Priority Data

Dec. 5, 2008 (KR) .................. 10-2008-0123307
Oct. 1, 2009 (KR) .................. 10-2009-0094028

(51) Int. Cl.
*H04B 7/02* (2006.01)
*H04L 5/12* (2006.01)

(52) U.S. Cl. .................. 375/276; 375/262

(58) Field of Classification Search .......... 375/260–262, 375/265, 267, 340, 341; 370/208, 310; 714/794, 714/795
See application file for complete search history.

(56) References Cited

U.S. PATENT DOCUMENTS

| 2004/0042565 A1* | 3/2004 | Garrett .................... 375/341 |
| 2007/0036246 A1* | 2/2007 | Hammerschmidt .......... 375/340 |
| 2007/0237272 A1 | 10/2007 | Hwang et al. |
| 2008/0137765 A1* | 6/2008 | Dalla Torre et al. ......... 375/261 |
| 2008/0152032 A1 | 6/2008 | Lee et al. |
| 2009/0052576 A1* | 2/2009 | Golitschek Edler Von Elbwart et al. .................. 375/298 |

FOREIGN PATENT DOCUMENTS

KR   10-2008-0059014 A    6/2008

OTHER PUBLICATIONS

Tae-Ho Im et al., A Computationally Efficient Signal Detection Method for Spatially Multiplexed MIMO Systems, The Journal of Korea Information and Communications Society (KICS), Jul. 2007, pp. 616-626, vol. 32, No. 7.

* cited by examiner

*Primary Examiner* — Young T. Tse
(74) *Attorney, Agent, or Firm* — Jefferson IP Law, LLP

(57) ABSTRACT

A method for signal detection using a log likelihood ratio in a multi-input multi-output communication system includes reconfiguring the signals received through the reception antennas on the basis of channel characteristics and acquiring candidate groups for each transmission symbol by acquiring a signal constellation of one quadrant with respect to signals generatable for each transmission symbol and signal constellations for the remaining quadrants on the basis of the reconfigured signals.

13 Claims, 18 Drawing Sheets

FIG. 1

| x \ h operation | a+jb | | a−jb | |
|---|---|---|---|---|
| | Real | Image | Real | Image |
| 0 | 1+j | a−b | a+b | a+b<br>im 0 | a−b<br>re 0 |
| 1 | 3+j | 3a−b | a+3b | 3a+b<br>im 2 | a−3b<br>re 2 |
| 2 | 1+3j | a−3b | 3a+b | a+3b<br>im 1 | 3a−b<br>re 1 |
| 3 | 3+3j | 3a−3b | 3a+3b | 3+3b<br>im 3 | 3a−3b<br>re 3 |
| 4 | 5+j | 5a−b | a+5b | 5a+b<br>im 8 | a−5b<br>re 8 |
| 5 | 7+j | 7a−b | a+7b | 7a+b<br>im 10 | a−7b<br>re 10 |
| 6 | 5+3j | 5a−3b | 3a+5b | 5a+3b<br>im 9 | 3a−5b<br>re 9 |
| 7 | 7+3j | 7a−3b | 3a+7b | 7a+3b<br>im 11 | 3a−7b<br>re 11 |
| 8 | 1+5j | a−5b | 5a+b | a+5b<br>im 4 | 5a−b<br>re 4 |
| 9 | 3+5j | 3a−5b | 5a+3b | 3a+5b<br>im 6 | 5a−3b<br>re 6 |
| 10 | 1+7j | a−7b | 7a+b | a+7b<br>im 5 | 7a−b<br>re 5 |
| 11 | 3+7j | 3a−7b | 7a+3b | 3a+7b<br>im 7 | 7a−3b<br>re 7 |
| 12 | 5+5j | 5a−5b | 5a+5b | 5a+5b<br>im 12 | 5a−5b<br>re 12 |
| 13 | 7+5j | 7a−5b | 5a+7b | 7a+5b<br>im 14 | 5a−7b<br>re 14 |
| 14 | 5+7j | 5a−7b | 7a+5b | 5a+7b<br>im 13 | 7a−5b<br>re 13 |
| 15 | 7+7j | 7a−7b | 7a+7b | 7a+7b<br>im 15 | 7a−7b<br>re 15 |

FIG. 3

| x[3:0] | Real | Image |
|---|---|---|
| 0000 | a−b | a+b |
| 0001 | 3a−b | a+3b |
| 0010 | a−3b | 3a+b |
| 0011 | 3a−3b | 3a+3b |
| 0100 | 5a−b | a+5b |
| 0101 | 7a−b | a+7b |
| 0110 | 5a−3b | 3a+5b |
| 0111 | 7a−3b | 3a+7b |
| 1000 | a−5b | 5a+b |
| 1001 | 3a−5b | 5a+3b |
| 1010 | a−7b | 7a+b |
| 1011 | 3a−7b | 7a+3b |
| 1100 | 5a−5b | 5a+5b |
| 1101 | 7a−5b | 5a+7b |
| 1110 | 5a−7b | 7a+5b |
| 1111 | 7a−7b | 7a+7b |

FIG. 4

QPSK

| b0 | + |    |    | M0 | M0 |
|    | − | M0 | M0 |    |    |
| b1 | + |    | M0 | M0 |    |
|    | − | M0 |    |    | M0 |

FIG. 9
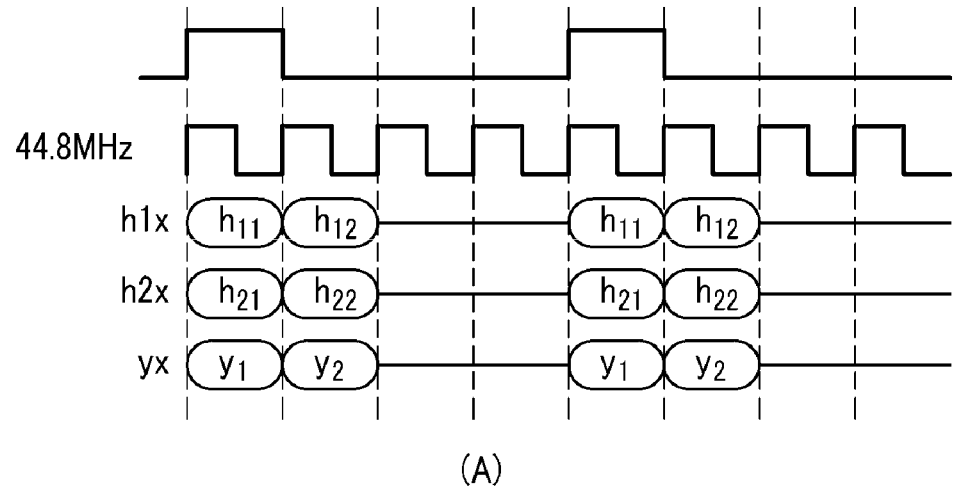
(A)
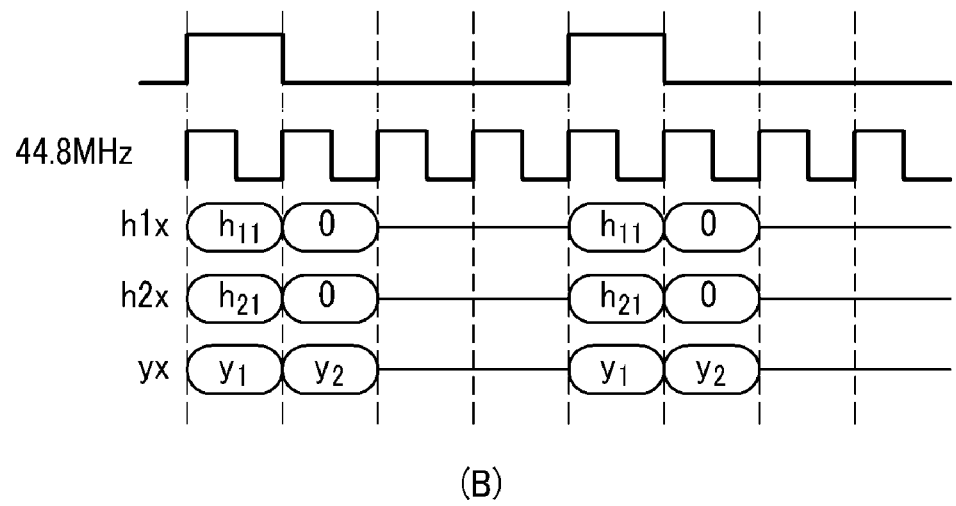
(B)
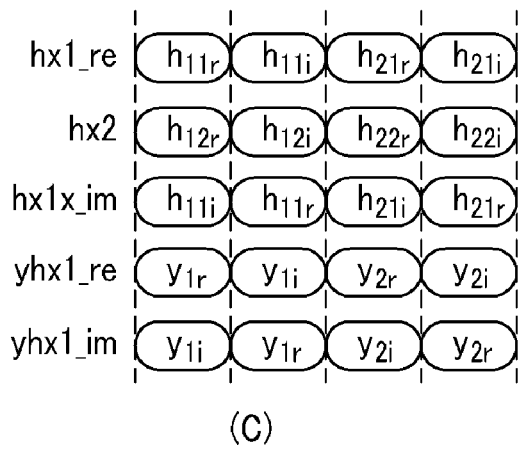
(C)

FIG. 11

FIG.15
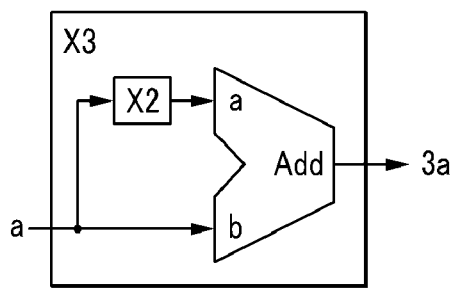
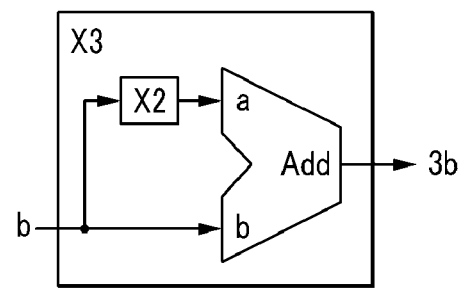
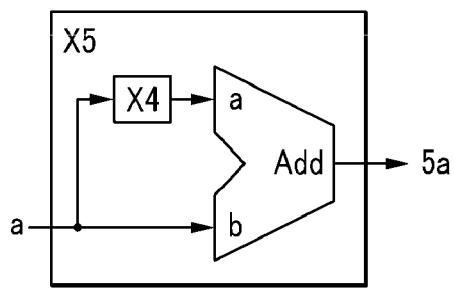
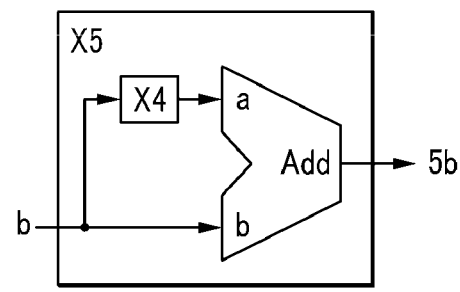
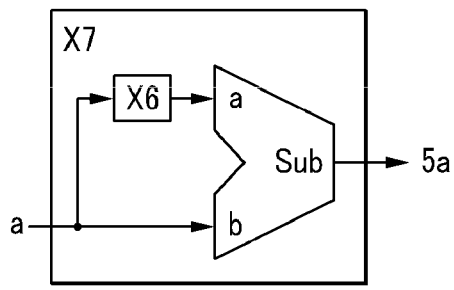
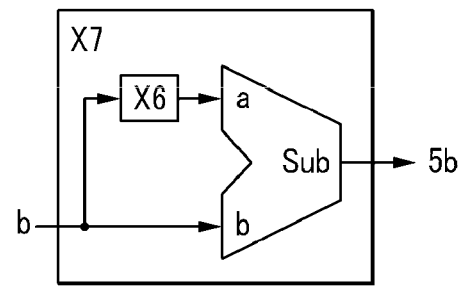

APPARATUS AND METHOD FOR SIGNAL DETECTION USING LOG LIKELIHOOD RATIO

CROSS-REFERENCE TO RELATED APPLICATION

This application claims priority to and the benefit of Korean Patent Application Nos. 10-2008-0123307 and 10-2009-0094028 filed in the Korean Intellectual Property Office on Dec. 5, 2008 and Oct. 1, 2009, the entire contents of which are incorporated herein by reference.

BACKGROUND OF THE INVENTION (a) Field of the Invention

The present invention a method and an apparatus of signal detection, and more particularly, to a method and an apparatus of signal detection using a log likelihood ratio in a multi-input multi-output wireless communication system.

(b) Description of the Related Art

In a wireless communication system, since a bandwidth is very limitative, it is very important to support a high data transmission rate to various users by using only the limitative bandwidth. A multiple-input multiple-output (hereinafter, referred to as "MIMO") communication system has several antennas on a transmitter and a receiver and simultaneously transmits multiple signals by using the same wireless band on the transmitter in order to meet the above-mentioned requirement. As a result, it is possible to remarkably improve transmission rate without increasing the bandwidth.

In the MIMO communication system, the transmitter transmits different data by using a plurality of antennas, and in this case, a signal of each antenna experiences independent fading. Therefore, the receiver should differentiate transmitted data through proper signal processing. At this time, signals transmitted from another antenna are overlapped and thus cause inter-antenna interference which is an interference factor increasing errors.

As a method of detecting the transmitted data while removing the Interference factors, a maximum likelihood (hereinafter, referred to as "ML") method is used. This method shows the best performance, but is very high in complexity of a signal detecting process. In particular, as the number of transmission antennas increases, the complexity increases exponentially. Therefore, a modified ML (hereinafter, referred to as "M-ML") method having low complexity while providing the same performance as the ML method is proposed.

However, in the MIMO system, since signals transmitted by a single-input multiple-output (SIMO) scheme and signals transmitted by a multiple user-MIMO (MU-MIMO) scheme are used, a case in which using the ML method is optimal and a case in which using the M-ML method is optimal at the time of detecting the signal are mixed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method that can effectively detect a signal by using an optimal signal detection method in a multi-input multi-output communication system.

Further, the present invention has been made in an effort to provide an apparatus and a method that can efficiently detect a signal by using an ML method and an M-ML method at the time of detecting the signal in a multi-input multi-output communication system.

Further, the present invention has been made in an effort to provide an apparatus and a method that can detect a signal by implementing an ML method and an M-ML method in a simpler method in a multi-input multi-output communication system.

An exemplary embodiment of the present invention provides a method for signal detection in a multi-input multi-output communication system receiving signals transmitted through a plurality of transmission antennas by using a plurality of reception antennas, that includes: reconfiguring the signals received through the reception antennas on the basis of channel characteristics; acquiring candidate groups for each transmission symbol by acquiring a signal constellation of one quadrant with respect to signals that can be generated for each transmission symbol and signal constellations for the remaining quadrants on the basis of the reconfigured signals; calculating metrics for the acquired candidate groups for each transmission symbol; and generating a log likelihood ratio (LLR) for signals constituting the candidate group for each transmission symbol on the basis of the calculated metrics of the candidate groups for each transmission symbol.

Another embodiment of the present invention provides a method for signal detection in a multi-input multi-output communication system receiving signals transmitted through a plurality of transmission antennas by using a plurality of reception antennas, that includes: reconfiguring the signals received through the reception antennas on the basis of channel characteristics; acquiring a signal constellation of one quadrant with respect to signals that can be generated for each transmission symbol on the basis of the reconfigured signals; acquiring signal constellations of the remaining quadrants by individually rotating the signal constellations of the one quadrant by a set angle several times; and acquiring the candidate groups for each transmission symbol on the basis of the acquired signal constellations of the quadrants.

Yet another embodiment of the present invention provides an apparatus for signal detection in a multi-input multi-output communication system receiving signals transmitted through a plurality of transmission antennas by using a plurality of reception antennas, that includes: an input processor reconfiguring the signals received through the reception antennas on the basis of channel characteristics; a signal detector acquiring candidate groups for each transmission symbol by acquiring a signal constellation of one quadrant with respect to signals that can be generated for each transmission symbol and signal constellations for the remaining quadrants on the basis of the reconfigured signals; a metric calculator calculating metrics for the acquired candidate groups for each transmission symbol; and an LLR generator generating a log likelihood ratio (LLR) for signals constituting the candidate group for each transmission symbol on the basis of the calculated metrics of the candidate groups for each transmission symbol.

BRIEF DESCRIPTION OF THE DRAWINGS

FIG. 1 is an exemplary diagram showing two operations that are subjected to a complex relationship according to an exemplary embodiment of the present invention;

FIG. 3 is an exemplary diagram showing a multiplying operation of a transmission symbol acquired by a sliding operation according to an exemplary embodiment of the present invention;

FIGS. 4 and 5 are exemplary diagrams showing a process of operating an LLR in case of 64-QAM in an exemplary embodiment of the present invention;

FIG. 9 is an exemplary diagram showing reconfiguration processing of received signals of an input processor according to an exemplary embodiment of the present invention;

FIG. 11 is a diagram showing signals inputted into first and second operators and output signals of a signal detector according to an exemplary embodiment of the present invention;

FIG. 15 is a block diagram illustrating a detailed configuration of blocks X3, X5, and X7 shown in FIG. 14;

DETAILED DESCRIPTION OF THE EMBODIMENTS

Figure 2:
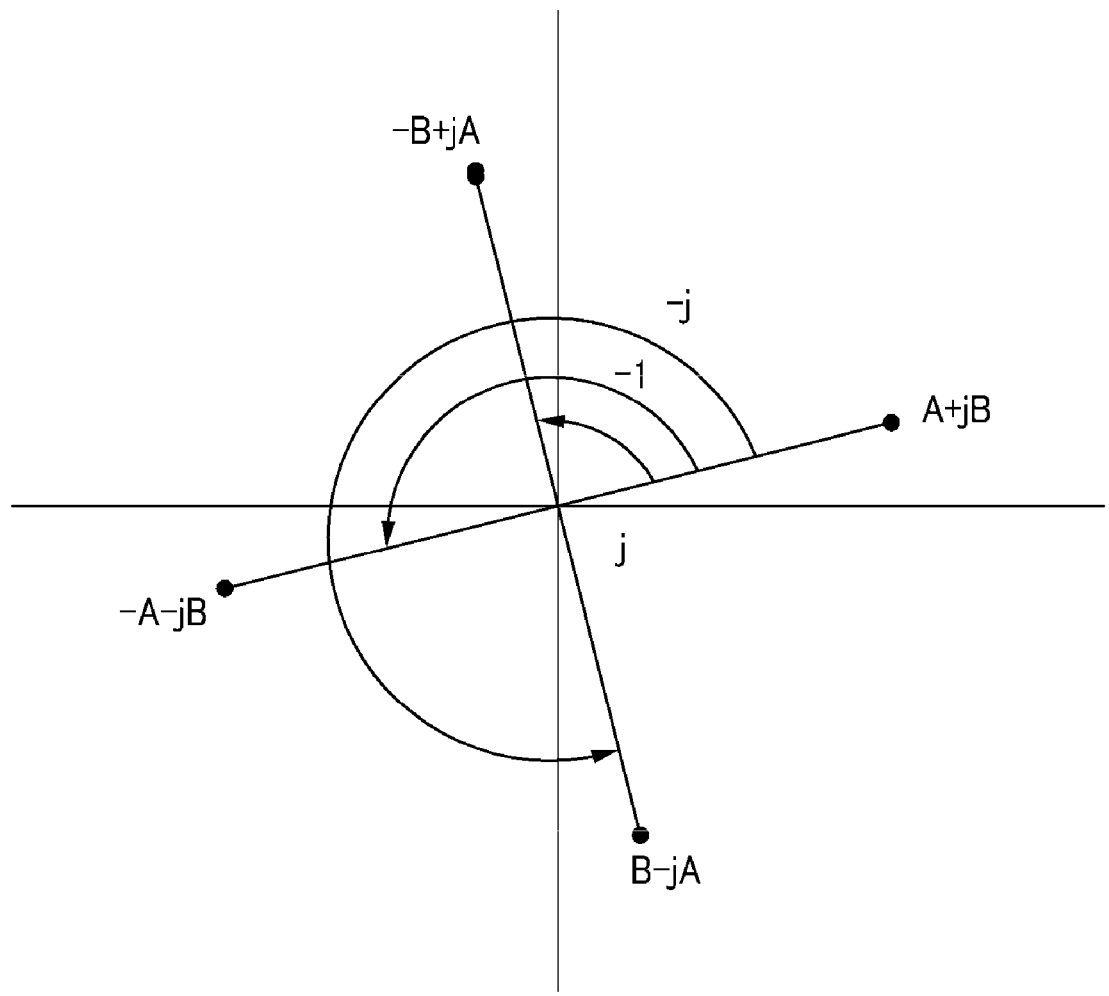
FIG. 2 is a diagram showing phase rotation generated by multiplying on a signal constellation according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, exemplary embodiments of the present invention will be described with reference to the accompanying drawings.

The exemplary embodiments of the present provide an apparatus and a method for signal detection that can optimally detect a signal by selectively using an ML method and an M-ML method in a MIMO communication system: More specifically, in the MIMO communication system, while detecting the signal by using the M-ML method in a case where a signal is transmitted through two or more transmission antennas and detecting the signal by using the ML method in a case where the signal is transmitted through one transmission antenna, a log-likelihood ratio (LLR) for soft-decision in channel decoding is efficiently generated.

First, the method for signal detection according to the exemplary embodiment of the present invention will be described.

In the embodiment to be described, in the MIMO communication system using two reception antennas, the signal is detected as an example, and in particular, the method for signal detection according to the exemplary embodiment of the present invention will be described by using a 4×2 MU-MIMO communication system including four transmission antennas and two reception antennas as an example.

In the exemplary embodiment, in a case where a 2-stream transmission signal is transmitted from a transmitter and received, that is, in a 2×2 MIMO communication system, the signal is detected by using the M-ML method and a 1-stream transmission signal is transmitted from the transmitter and received, that is, in a 1×2 communication system, the signal is detected by using the ML method to estimate transmission signal vectors, Euclidean distances for the estimated candidate transmission signal vectors are calculated, and the LLR is computed on the basis of the distances.

First, in the MIMO system, the received signal may be expressed as follows.

$r = Hx + n$ $y = Hx + n$ [Equation 1]

Herein, r represents a reception signal vector, $H = [h_1, h_2, \ldots, h_{n_t}]$ represents a channel matrix, $X = [x_1, x_2, \ldots, x_{n_t}]$ represents a transmission signal vector, and $x_i$, each element of the transmission signal vector x, represents a transmission symbol. In addition, n, which is an N×1 matrix constituted by noise generated from a receiver, is the zero-mean complex additive white Gaussian noise (AWGN) of which the mean is 0 and the distribution is $N_0$.

The received signal may be expressed as follows by being applied to the 4×2 MU-MIMO system in which the received signal is received from four transmission antennas to two reception antennas.

$$\begin{bmatrix} r_1 \\ r_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} x_1 \\ x_2 \\ x_3 \\ x_4 \end{bmatrix} + \begin{bmatrix} n_1 \\ n_2 \end{bmatrix}$$ [Equation 2]

$$\begin{bmatrix} y_1 \\ y_2 \end{bmatrix} = \begin{bmatrix} h_{11} & h_{12} & h_{13} & h_{14} \\ h_{21} & h_{22} & h_{23} & h_{24} \end{bmatrix} \begin{bmatrix} x_1 \\ x_2 \\ x_3 \\ x_4 \end{bmatrix} + \begin{bmatrix} n_1 \\ n_2 \end{bmatrix}$$

In the received signal having the characteristic, if the 2-stream signal transmitted from the transmitter to the receiver is represented by $x_1$ and $x_2$, $x_3$ and $x_4$ in the received signal serve as an interference signal that is a signal transmitted from the transmitter to another receiver. Therefore, the interference signals $x_3$ and $x_4$ may be separated from the received signal as follows.

$$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix} \quad \text{[Equation 3]}$$

$$\tilde{y} = [\tilde{h}_1, \tilde{h}_2]x + \tilde{n} \quad \text{[Equation 4]}$$

Herein, $\tilde{y}$ represents a reception signal vector from which the interference signals $x_3$ and $x_4$ are removed.

In order to express the received signal expressed as shown in Equation 4 more simply, the noise may be removed as follows.

$$y = [h_1, h_2]x \quad \text{[Equation 5]}$$

$$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} \quad \text{[Equation 6]}$$

As such, after the received signal is simplified by removing the interference signals and the noise from the received signal, the ML method is used to detect the signal from the received signal.

Therefore, first, influences on all signals of the transmission symbol $x_1$ may be removed from the received signal as follows. That is, when numbers of cases of all signal constellations are substituted in the transmission symbol $x_1$ and removed from the received signal, the received signal may be expressed as follows.

$$\bar{y}^{x_1} = y - h_1 x_1 \quad \text{[Equation 7]}$$

$$\begin{bmatrix} \bar{y}_1^{x_1} \\ \bar{y}_2^{x_1} \end{bmatrix} = \begin{bmatrix} y_1 \\ y_2 \end{bmatrix} - \begin{bmatrix} h_{11} \\ h_{21} \end{bmatrix} x_1 \quad \text{[Equation 8]}$$

Herein, $\bar{y}^{x_1}$ represents a received signal from which the influences on all the signals of the transmission symbol $x_1$ are removed.

The transmission symbol $x_2$ may be acquired by using the received signal as follows.

$$x_2 = Q\left(\frac{h_2^H}{\|h_2\|^2} \bar{y}^{x_1}\right) \quad \text{[Equation 9]}$$

$$= Q\left(\frac{1}{h_{12}^2 + h_{22}^2}\left([h_{12}^* \ h_{22}^*]\begin{bmatrix} y_1 \\ y_2 \end{bmatrix} - [h_{12}^* \ h_{22}^*]\begin{bmatrix} h_{11} \\ h_{21} \end{bmatrix} x_1\right)\right)$$

Therefore, finally, the transmission symbol $x_2$ is expressed as follows.

$$\therefore x_2 = Q\left(\frac{h_{12}^* y_1 + h_{22}^* y_2 - (h_{12}^* h_{11} + h_{22}^* h_{21})x_1}{h_{12}^2 + h_{22}^2}\right) \quad \text{[Equation 10]}$$

Herein, $Q(\cdot)$ represents a sliding operation. The sliding operation maps the signal the closest constellation, that is, approximates the closest signal in accordance with a modulation method. In the apparatus according to the exemplary embodiment of the present invention, the sliding operation is performed by using a comparator, but is not necessarily limited thereto.

The Euclidean distance, that is, a metric with respect to the determined $x_1$ and $x_2$, can be calculated as follows.

$$D(\overline{x_n}) = \|y - [h_1, h_2]x_n\| \quad \text{[Equation 11]}$$

$$= \left\|\begin{bmatrix} y_1 \\ y_2 \end{bmatrix} - \begin{bmatrix} h_{11} & h_{12} \\ h_{21} & h_{22} \end{bmatrix}\begin{bmatrix} x_1 \\ x_2 \end{bmatrix}\right\|$$

$$= \left\|\begin{bmatrix} y_1 - (h_{11}x_1 + h_{12}x_2) \\ y_2 - (h_{21}x_1 + h_{22}x_2) \end{bmatrix}\right\|$$

$$= \sqrt{\begin{array}{l}[y_1 - (h_{11}x_1 + h_{12}x_2)]^2 + \\ [y_2 - (h_{21}x_1 + h_{22}x_2)]^2\end{array}}$$

Next, influences on all signals of the transmission symbol $x_2$ may be removed from the received signal as follows. That is, when numbers of cases of all signal constellations are substituted in the transmission symbol $x_2$ and removed from the received signal, the received signal may be expressed as follows.

$$\bar{y}^{x_2} = y - h_2 x_2 \quad \text{[Equation 12]}$$

$$\begin{bmatrix} \bar{y}_1^{x_2} \\ \bar{y}_2^{x_2} \end{bmatrix} = \begin{bmatrix} y_1 \\ y_2 \end{bmatrix} - \begin{bmatrix} h_{12} \\ h_{22} \end{bmatrix} x_2 \quad \text{[Equation 13]}$$

Herein, $\bar{y}^{x_2}$ represents a received signal from which the influences on all the signals of the transmission symbol $x_2$ are removed. The transmission symbol $x_1$ may be acquired by using the received signal as follows.

$$x_1 = Q\left(\frac{h_1^H}{\|h_1\|^2} \bar{y}^{x_2}\right) \quad \text{[Equation 14]}$$

$$= Q\left(\frac{1}{h_{11}^2 + h_{21}^2}\left([h_{11}^* \ h_{21}^*]\begin{bmatrix} y_1 \\ y_2 \end{bmatrix} - [h_{11}^* \ h_{21}^*]\begin{bmatrix} h_{12} \\ h_{22} \end{bmatrix} x_2\right)\right)$$

Therefore, finally, the transmission symbol $x_1$ is expressed as follows.

$$\therefore x_1 = Q\left(\frac{h_{11}^* y_1 + h_{21}^* y_2 - (h_{11}^* h_{12} + h_{21}^* h_{22})x_2}{h_{11}^2 + h_{21}^2}\right) \quad \text{[Equation 15]}$$

The metric can be acquired by applying the determined $x_1$ and $x_2$ to Equation 11.

Through the above-mentioned process, in a case where the modulation method is 64-QAM, 64 cases $x_1$ and 64 metrics $D(\overline{x_n})$ corresponding thereto are generated, and further, 64 cases $x_2$ and 64 metrics $D(\overline{x_n})$ generated by $x_1$ corresponding thereto are generated. Therefore, a total of 128 metrics $D(\overline{x_n})$ are generated. That is, in the case of 64-QAM, 128 candidate vector groups $$\begin{bmatrix} x_1 \\ x_2 \end{bmatrix}$$

and 128 metrics $D(\overline{x_n})$ are generated. The LLR is acquired by using a Max-log MAP in order to generate soft-decision bits from the generated metrics.

The transmission symbols $x_1$ and $x_2$ have 2 bits ($\pm 1 \pm j$) when modulated by quadrature phase shift keying (QPSK), 4 bits ($\pm 1 \pm j$, $\pm 1 \pm 3j$, $\pm 3 \pm j$, $\pm 3 \pm 3j$) when modulated by 16-ary quadrature amplitude modulation (16QAM), and 6 bits ($\pm 1 \pm j$, $\pm 1 \pm 3j$, $\pm 1 \pm 5j$, $\pm 1 \pm 7j$, $\pm 3 \pm 1j$, $\pm 3 \pm 3j$, $\pm 3 \pm 5j$, $\pm 3 \pm 7j$, $\pm 5 \pm j$, $\pm 5 \pm 3j$, $\pm 5 \pm 5j$, $\pm 5 \pm 7j$, $\pm 7 \pm j$, $\pm 7 \pm 3j$, $\pm 7 \pm 5j$, $\pm 7 \pm 7j$) when modulated by 64-QAM.

For example, when modulated by 64-QAM, $x_1$ and $x_2$ are formed by 6 bits and LLR for a first bit of $x_1$ can be acquired as follows.

$$L(b_{01}) = \min_{b_{01}=-1}(D(\overline{x_n})) - \min_{b_{01}=+1}(D(\overline{x_n})) \quad \text{[Equation 16]}$$

Herein, $L(b_{01})$ is an LLR for a first bit of the transmission symbol $x_1$, $$\min_{b_{01}=-1}(D(\overline{x_n}))$$

represents a metric having a minimum value among metrics $D(\overline{x_n})$ in which the first bit for the transmission symbol is $x_1$ is $-1$, and $$\min_{b_{01}=+1}(D(\overline{x_n}))$$

represents a metric having a minimum value among metrics $D(\overline{x_n})$ in which the first bit is $+1$. That is, a difference between $$\min_{-b_{01}=-1}(D(\overline{x_n}))$$

having the minimum value and $$\min_{+b_{01}=-1}(D(\overline{x_n}))$$

having the minimum value is an LLR for a predetermined bit.

On the basis of Equation 16, LLRs for the remaining bits of the transmission symbol $x_1$, that is, $L(b_{11})$, $L(b_{21})$, $L(b_{31})$, $L(b_{41})$, $L(b_{51})$ can be acquired.

Further, in the same manner, LLRs for all the bits of the transmission symbol $x_2$, that is, $L(b_{02})$, $L(b_{12})$, $L(b_{22})$, $L(b_{32})$, $L(b_{42})$, $L(b_{52})$ can be acquired.

An LLR for a first bit for the transmission symbol $x_2$ is expressed as follows.

$$L(b_{02}) = \min_{b_{02}=-1}(D(\overline{x_n})) - \min_{b_{02}=+1}(D(\overline{x_n})) \quad \text{[Equation 17]}$$

As described above, in a case when the 2-stream signal is transmitted from the transmitter and received, the transmission symbols are detected by using the M-ML method and LLRs for the detected transmission symbols can be acquired.

Meanwhile, in a case where the 1-stream signal is transmitted from the transmitter, the transmission symbol is detected by using the ML-method and an LLR for the detected transmission symbol can be acquired.

$$x_{ML} = \arg\min_{x} \|y - Hx\| \quad \text{[Equation 18]}$$

This equation is related to 1-stream and is calculated on the basis of metrics for all possible signals for the transmission symbol $x_1$. Therefore, in the above-mentioned M-ML method, this equation corresponds to a case without the transmission symbol $x_2$. Therefore, an operation relating to $x_2$ is removed from Equation 11 acquiring the metric for the transmission symbol in the M-ML method, and as a result, the metric for the 1-stream can be acquired by using the M-ML method. This can be expressed in a numerical formula as follows.

$$\begin{aligned} D(\overline{x_n}) &= \|y - h_1 x_1\| \\ &= \left\| \begin{bmatrix} y_1 \\ y_2 \end{bmatrix} - \begin{bmatrix} h_{11} \\ h_{21} \end{bmatrix} x_1 \right\| \\ &= \left\| \begin{bmatrix} y_1 - h_{11} x_1 \\ y_2 - h_{21} x_1 \end{bmatrix} \right\| \\ &= \sqrt{[y_1 - h_{11} x_1]^2 + [y_2 - h_{21} x_1]^2} \end{aligned} \quad \text{[Equation 19]}$$

As described above, after the metric for 1-stream, that is, metrics for one transmission symbol $x_1$, the LLR for each bit of the transmission symbol $x_1$ is acquired on the basis of the metrics as described above. That is, for each bit, a difference between a metric having the minimum value among (−) metrics and a metric having the minimum value among (+) metrics is acquired to calculate the LLR.

As such, the ML method can be simultaneously implemented by using the M-ML method.

In the exemplary embodiment of the present invention, the following method is used in order to implement the above-mentioned method in a simpler structure while detecting the signal on the basis of the logic. That is, when candidate vector groups are calculated according to Equation 10 and Equation 15, not all generatable symbols on the constellation are calculated, but only a quadrant on the constellation is operated and operation results of other quadrants are acquired by using the operation result.

More specifically, first, in the M-ML method, a common point between Equation 10 acquiring the transmission symbol $x_2$ and Equation 15 acquiring the transmission symbol $x_1$ can be expressed in a numerical formula as follows.

$$(h_{12}^* h_{11} + h_{22}^* h_{21}) = (h_{11}^* h_{12} + h_{21}^* h_{22})^* \quad \text{[Equation 20]}$$

This is analogized from the following complex operation features.

$$(A+B)^* = A^* + B^*$$

$$(AB)^* = A^*B^*$$

$$(A^*)^* = A \qquad \text{[Equation 21]}$$

Therefore, when $(h_{12}^*h_{11}+h_{22}^*h_{21})=a+jb$ in Equation 10, $(h_{11}^*h_{12}+h_{21}^*h_{22})=a-jb$ in Equation 15. That is, Equation 15 can be shared through the complex operation characteristic by one operation of Equation 10.

FIG. 1 is an exemplary diagram showing two operations that are subjected to a complex relationship according to an exemplary embodiment of the present invention, and FIG. 2 is a diagram showing phase rotation generated by multiplying on a signal constellation according to an exemplary embodiment of the present invention.

By considering a correlation between multiplication corresponding to a first quadrant of a+jb shown in FIG. 1 and 64-QAM and multiplication corresponding to the second quadrant of a−jb and 64-QAM, it can be understood that Equation 15 can be shared through the complex operation features by one operation of Equation 10.

Further, in Equation 10 and Equation 15, the transmission symbols $x_2$ and $x_1$ are multiplied by each other and this depends on the number of cases of the modulation method. That is, 4 signal constellations are multiplied in a case where the modulation method is QPSK, 6 signal constellations are multiplied in a case where the modulation method is 16-QPSK, and 64 signal constellations are multiplied in a case where the modulation method is 64-QAM. An operation for each guadrant on the signal constellation is not independently performed, but after an operation result for one quadrant is acquired, operation results for the remaining quadrants can be acquired by phase-rotating the operation result. That is, as shown in FIG. 1, only the 1-quadrant corresponding to ¼ of the entire signal constellation is operated, an operation result for a 2-quadrant is acquired by phase-rotating the operation result, an operation result for a 3-quadrant is acquired by phase-rotating the result, and an operation result for a 4-quadrant is acquired by phase-rotating the result. As such, by phase-rotating the operation result acquired for the 1-quadrant, the operation results of the 2-quadrant, the 3-quadrant, and the 4-quadrant of the signal constellation can be acquired, respectively. Herein, the used phase rotation is phase rotation of 90 degrees, and as shown in FIG. 2, the operation result for each quadrant of the signal constellation can be acquired only by converting a sign, a real part, and an imaginary part.

Accordingly, in the exemplary embodiment of the present invention, not all constellations that can be generated on the constellation are operated with respect to a symbol, but first, the signal constellation for the 1-quadrant of the constellation is calculated, and thereafter a multiplication result of the signal constellation of the remaining quadrants is acquired by phase-rotating the result, as shown in FIG. 2.

Further, as shown in FIG. 1, in a case where two operations have a complex relationship, since another operation can be acquired through a positional change of one operation as shown in FIG. 2, candidate symbol groups for one quadrant for the transmission symbol $x_1$ according to Equation 15 can be acquired by one operation by changing positions of candidate symbol groups for a predetermined quadrant on the signal constellation acquired with respect to the transmission symbol $x_2$ according to Equation 10. In addition, the candidate symbol groups for the remaining quadrants can be acquired by sequentially phase-rotating the candidate symbol groups for one quadrant for the transmission symbol $x_1$.

Through the process, $x_2$ and $x_1$ according to Equation 10 and Equation 15 are acquired. That is, when modulated into 64-QAM, 64 candidate symbol groups $$\begin{bmatrix} x_1 \\ x_2 \end{bmatrix}$$

according to $x_1$ and 64 candidate symbol groups $$\begin{bmatrix} x_1 \\ x_2 \end{bmatrix}$$

according to $x_2$ are acquired.

The metrics for the candidate symbols are calculated by using Equation 11 on the basis of the acquired values.

At this time, in a case where $x_2$ is acquired by using $x_1$, at the time of calculating the metric for the 64 candidate symbol groups $$\begin{bmatrix} x_1 \\ x_2 \end{bmatrix}$$

according to $x_1$, $h_{11}x_1$ and $h_{21}x_1$ are acquired by performing the operation shown in FIG. 1 and $h_{12}x_2$ and $h_{22}x_2$ are acquired through the following operation method by using $x_2$.

FIG. 3 is an exemplary diagram showing a multiplying operation of a transmission symbol acquired by a sliding operation according to an exemplary embodiment of the present invention.

As described above, in the same manner, in a case where $x_1$ is acquired by using $x_2$, at the time of calculating the metric for 64 candidate symbols $$\begin{bmatrix} x_1 \\ x_2 \end{bmatrix}$$

according to $x_2$, $h_{12}x_2$ and $h_{22}x_2$ are acquired through the operation shown in FIG. 1 and $h_{11}x_1$ and $h_{21}x_1$ are processed and acquired through the operation method of FIG. 3 on the basis of the acquired $x_1$.

Meanwhile, the LLR for soft-decision for the acquired metric values can be acquired in link with the above-mentioned process.

That is, in the exemplary embodiment of the present invention, as described above, after the candidate symbol group for the 1-quadrant is acquired by quartering the signal constellation, the candidate symbol groups for the remaining quadrants are acquired by sequentially phase-rotating the acquired candidate symbol groups for the 1-quadrant and the metric for each acquired candidate symbol group can be acquired. Therefore, it is possible to reduce an LLR calculation amount in link with calculation of the LLR.

Figure 4:
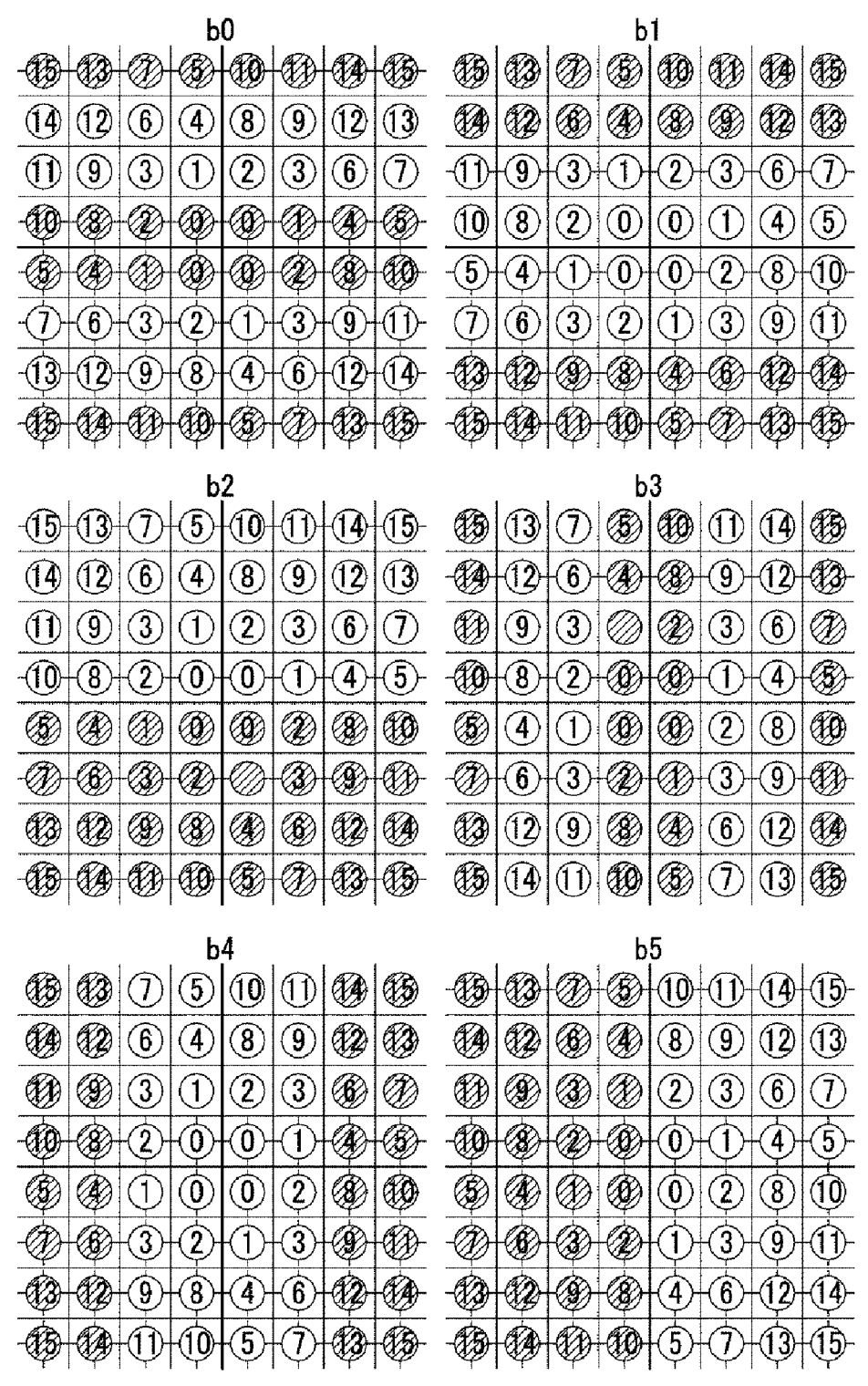
Figure 5:
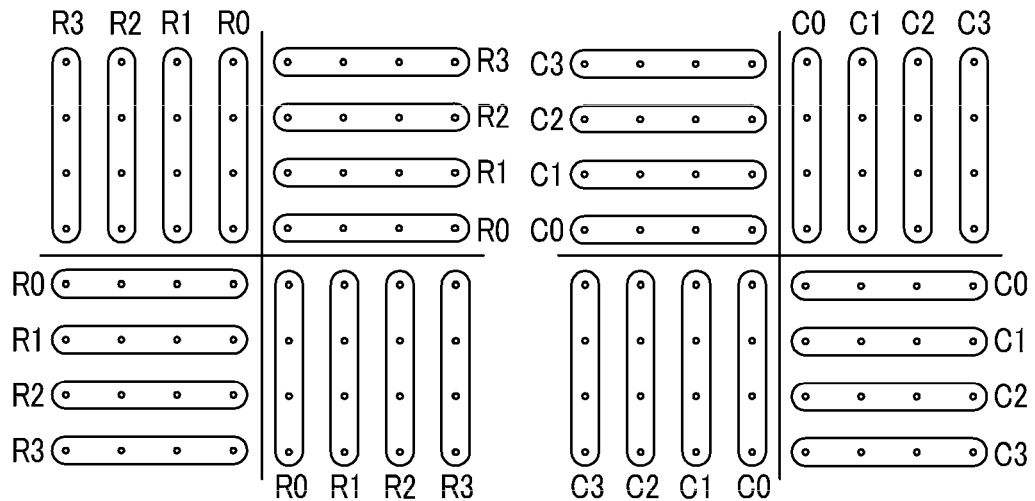

FIGS. 4 and 5 are exemplary diagrams showing a process of operating an LLR according to an exemplary embodiment of the present invention, and in particular, is an exemplary diagram showing a process of operating the LLR in case of 64-QAM. In FIGS. 4 and 5, a marked part is a part where a bit value has (+) and the remaining parts are parts where the bit value has (−).

In FIGS. 4 and 5, among values for a bit b0, a difference between the smallest value by comparing 32 values having (−) and the smallest value by comparing 32 values having (+) corresponds to an LLR value of the bit b0.

In the exemplary embodiment of the present invention, the candidate symbol groups acquired for the 1-quadrant are acquired by quartering the signal constellation and metrics are acquired by acquiring the candidate symbol groups for the remaining quadrants while phase-changing the candidate symbol groups acquired for the 1-quadrant, such that the LLR operation is performed in link therewith.

More specifically, since the operation is performed by the unit of the 1-quadrant, first, the metric having the smallest value among the metrics acquired for the candidate symbol groups of the 1-quadrant is stored as the value for the 1-quadrant, the smallest value is selected from the matrices acquired for candidate symbol groups of the 2-quadrant, and the selected value is compared with the value of the 1-quadrant to store the smaller value of them as the value for the 2-quadrant. In addition, the smallest value is selected from the metrics acquired for the candidate symbol groups of the 3-quadrant, and thereafter, the selected value is compared with the value of the 2-quadrant to store the smaller value of them as the value for the 3-quadrant. Further, the smallest value is selected from the metrics acquired for the candidate symbol groups of the 4-quadrant, and thereafter, the selected value is compared with the value of the 3-quadrant to store the smaller value of them as the value for the 4-quadrant. For example, as shown in FIGS. 4 and 5, in a case where the number of metrics acquired for the quadrants is 8, a total of 32 values are compared with each other through the above-mentioned processes.

In the exemplary embodiment of the present invention, the comparison operation in each quadrant is repeated whenever the phase is rotated. Likewise, since b1, b2, b3, b4, and b5 have parts duplicated with the b0 operation, the operation amount is reduced to ¼ by comparing the LLR values with each other as shown in FIGS. 4 and 5.

In the same manner as above, the LLRs can be acquired in case of 16-QAM and QPSK.

Figure 6:
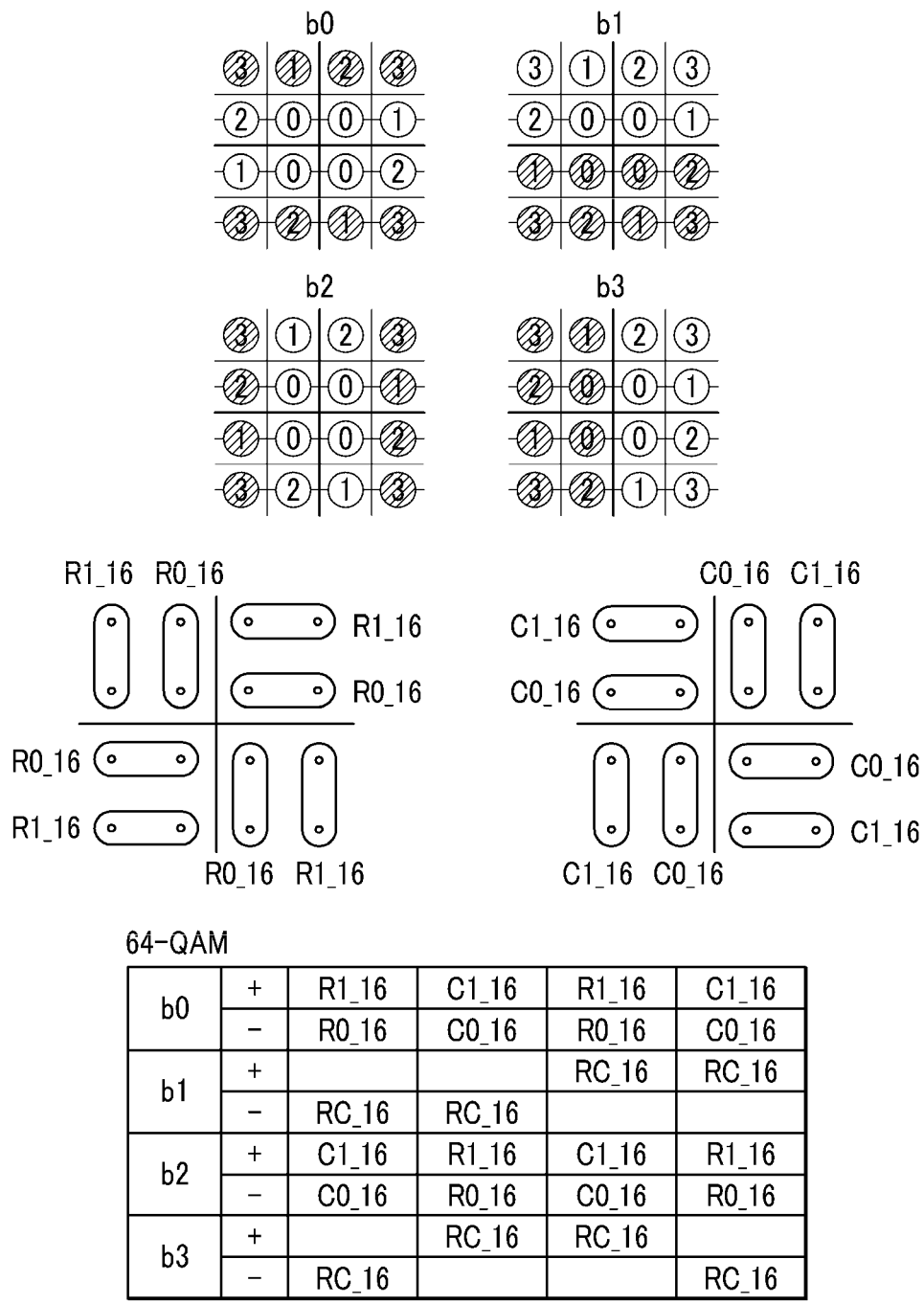
FIG. 6 is an exemplary diagram showing a process of operating an LLR in case of 16-QAM in an exemplary embodiment of the present invention.
Figure 7:
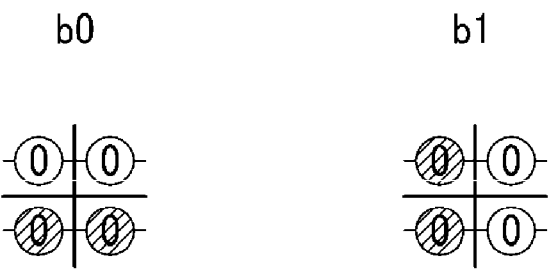
FIG. 7 is an exemplary diagram showing a process of operating an LLR in case of QPSK in an exemplary embodiment of the present invention.

FIG. 6 is an exemplary diagram showing a process of operating an LLR in a case of 16-QAM in an exemplary embodiment of the present invention, and FIG. 7 is an exemplary diagram showing a process of operating an LLR in a case of QPSK in an exemplary embodiment of the present invention.

Of course, the LLR is operated not by performing an additional operation for 16-QAM or QPSK, but by selectively using the operation result in 64-QAM depending on the modulation method.

Next, an apparatus for signal detection for implementing the signal detection method according to an exemplary embodiment of the present invention will be described.

Figure 8:
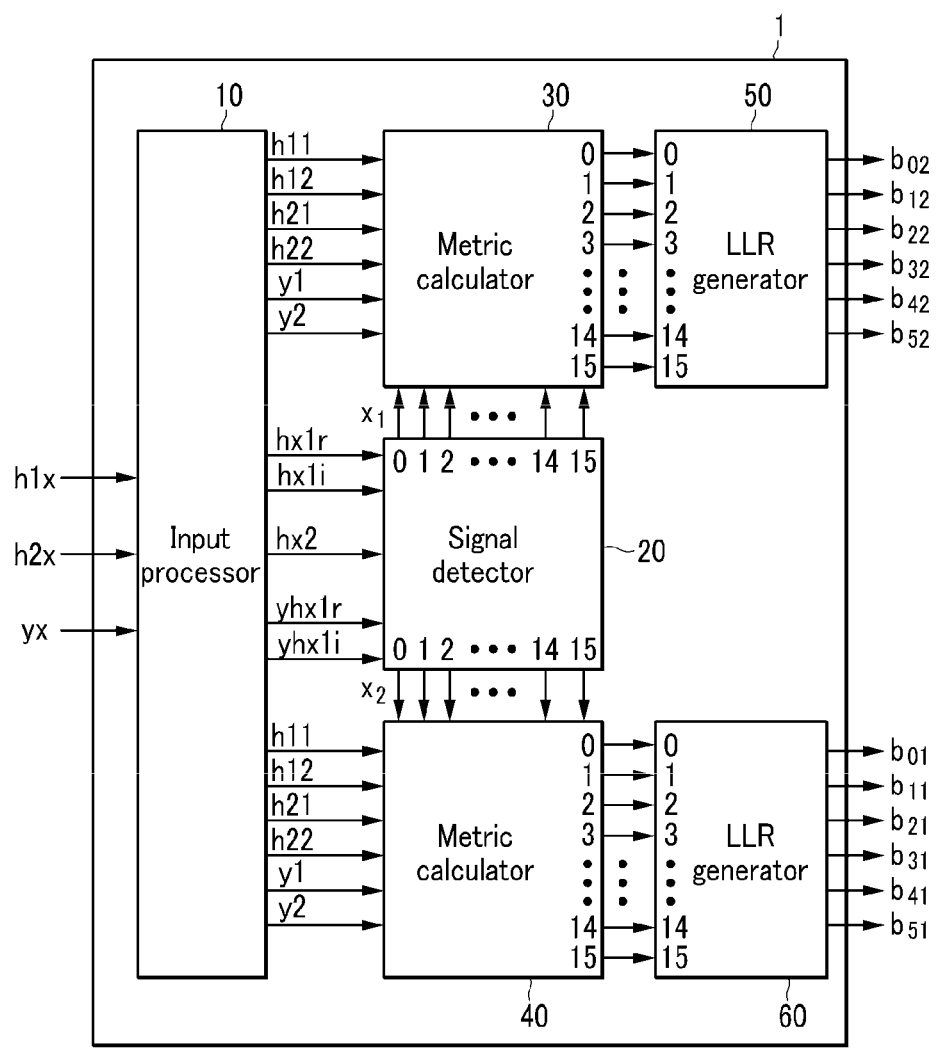
FIG. 8 is a configuration diagram of an apparatus for signal detection according to an exemplary embodiment of the present invention.

FIG. 8 is a configuration diagram of an apparatus for signal detection according to an exemplary embodiment of the present invention.

As shown in FIG. 8, the signal detection apparatus 1 according to the exemplary embodiment of the present invention includes an input processor 10, a signal detector 20, metric calculators 30 and 40, and LLR generators 50 and 60.

When received signals that are received through a plurality of reception antennas and processed by baseband sample data are inputted, the input processor 10 processes and outputs the received signals. In particular, the input processor 10 reconfigures signal streams received through the reception antennas on the basis of characteristics of a channel so as to easily process the signal streams in each unit, and outputs them.

FIG. 9 is an exemplary diagram showing reconfiguration processing of received signals of an input processor 10 according to an exemplary embodiment of the present invention.

When the signals are received through two reception antennas, signals h1x, h2x, and yx representing the characteristics of the channel are inputted into the input processor 10. When 2-stream received signals are inputted, h1x, h2x, and yx are sequentially inputted on the basis of a channel matrix characteristic as shown in FIG. 9A. When a 1-stream received signal is inputted, signals h1x, h2x, and yx are sequentially inputted as shown in FIG. 9B. At this time, since no signal is received through the second antennas, values of $h_{12}$ and $h_{22}$ are 0.

The input processor 10 according to the exemplary embodiment of the present invention outputs signals h1x_re, hx2, hx1_im, yhx1_re, and yhz1_im having forms shown in FIG. 9C by reconfiguring the inputted signals h1x, h2x, and yx having the characteristics.

Meanwhile, the signal detector 20 detects a transmission symbol from each of the received signals on the basis of the channel matrix characteristics and the received signals that are inputted through reconfiguration.

Figure 10:
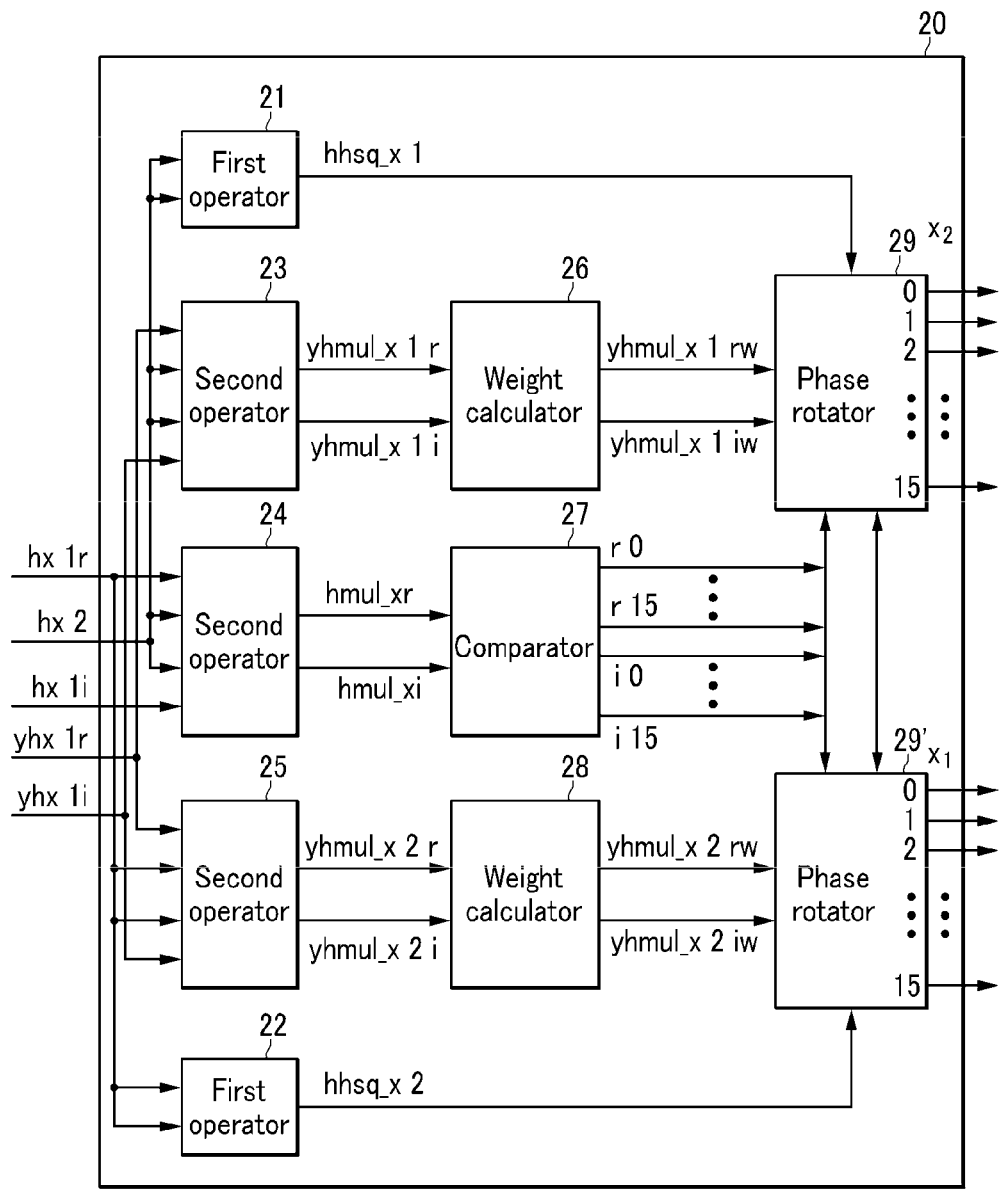
FIG. 10 is a detailed configuration diagram of a signal detector according to an exemplary embodiment of the present invention.

FIG. 10 is a detailed configuration diagram of a signal detector 20 according to an exemplary embodiment of the present invention.

As shown in FIG. 10, the signal detector 20 according to the exemplary embodiment of the present invention includes first operators 21 and 22, second operators 23, 24, and 25, weight calculators 26 and 28, a comparator 27, and phase rotators 29 and 29'.

Figure 11:
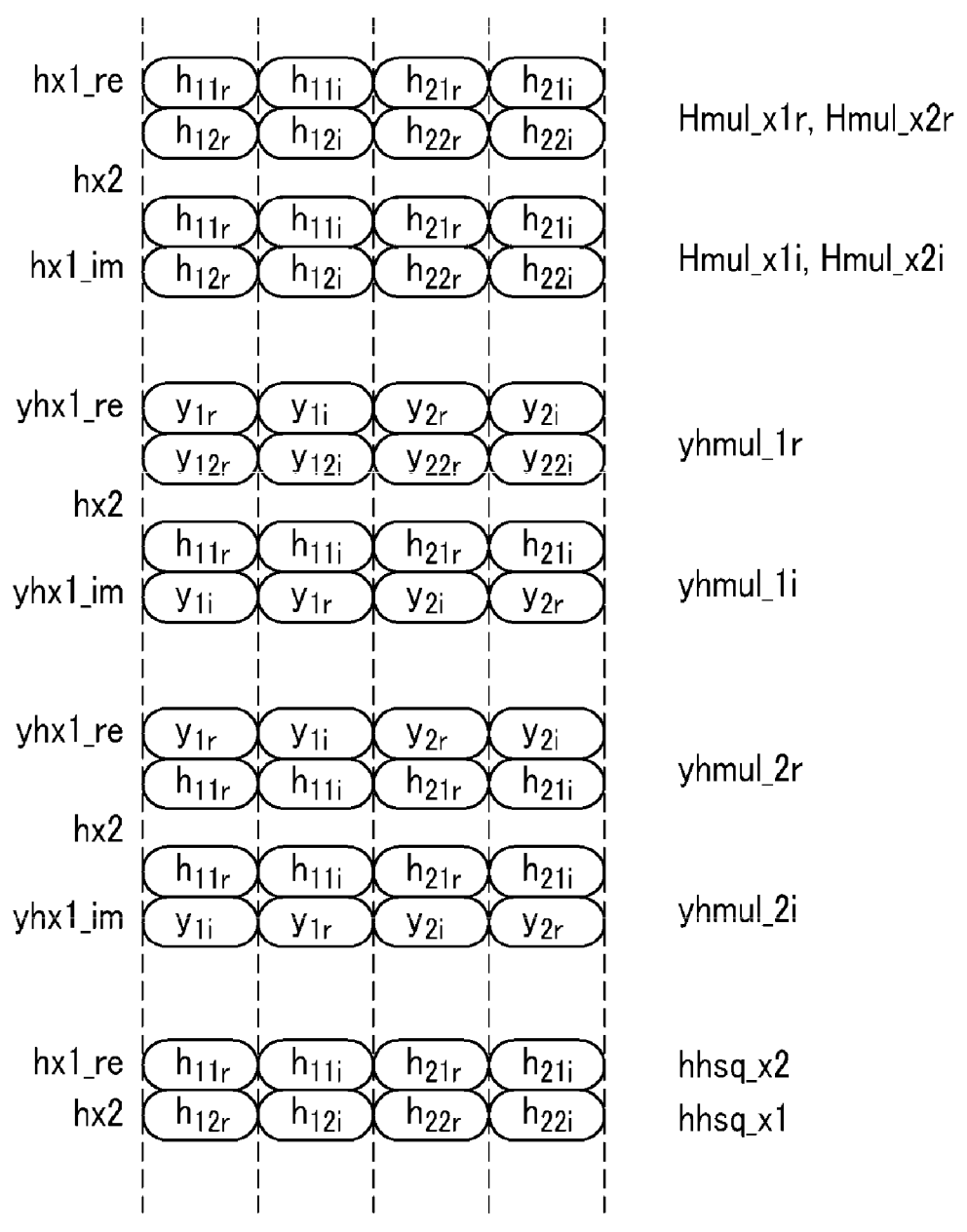

FIG. 11 is a diagram showing signals inputted into first and second operators and output signals of a signal detector according to an exemplary embodiment of the present invention.

Figure 12:
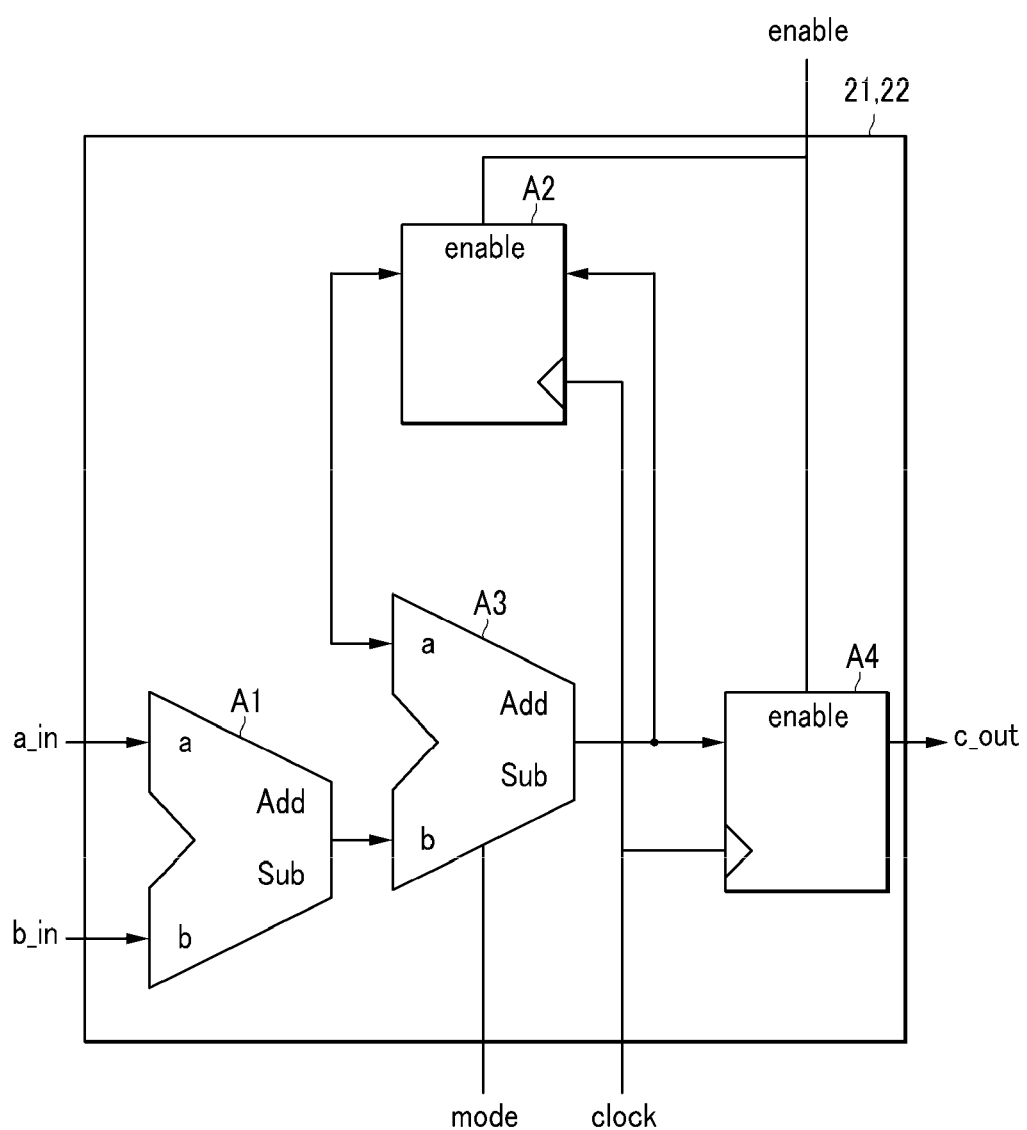
FIG. 12 is a diagram showing a configuration of an operator according to an exemplary embodiment of the present invention.
Figure 13:
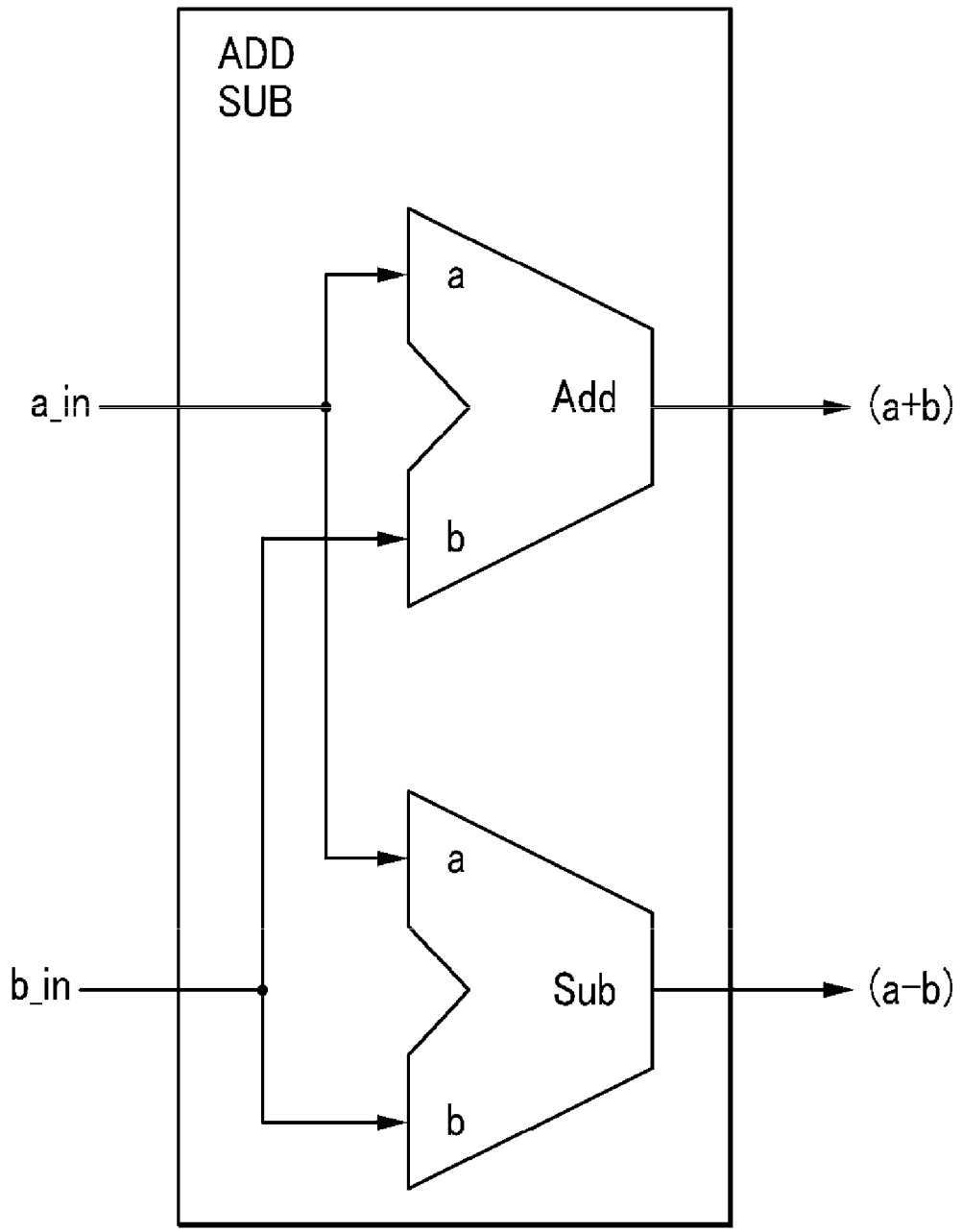
FIG. 13 is a diagram showing configurations of an adder and a subtracter used in an operator according to an exemplary embodiment of the present invention.

The plurality of first operators 21 and 22 each perform a multiplying operation of complex number signals h1x_re and hx2 representing the channel characteristics of the reception antenna, and have a structure shown in FIG. 12. FIG. 12 is a diagram showing a configuration of an operator according to an exemplary embodiment of the present invention, and FIG. 13 is a diagram showing configurations of an adder and a subtracter used in an operator according to an exemplary embodiment of the present invention.

As shown in FIG. 12, more specifically, the first operators 21 and 22 include a multiplier A1 that performs multiplication of the applied complex number signals, a register A2 that outputs a predetermined value inputted according to an applied enable signal, an adding and subtracting unit A3 that outputs values acquired by performing adding and subtracting operations by setting the value inputted from the register as a real part and the output value of the multiplier A1 as an imaginary part, and a register A4 that stores the outputs of the adding and subtracting unit and outputs them according to the applied enable signal.

The first operator 21 performs an operation for the complex number signal hx2 representing the channel characteristic of the second reception antenna, that is, $h_{12}^2 + h_{22}^2$ shown in Equation 10, for detecting $x_2$, as shown in FIG. 11. The first operator 22 performs an operation for the complex number signal h1x_re representing the channel characteristic of the first reception antenna, that is, $h_{11}^2 + h_{21}^2$ shown in Equation 15 for detecting $x_1$.

Meanwhile, the plurality of second operators 23, 24, and 26 each multiply the complex number signals h1x_re and hx2 representing the channel characteristics of the reception antenna by the received signals yhx1r and yhx1i according to the channel characteristics. For this, two operators (not shown) having the same structure as the first operator are included. That is, operators constituting the second operators 23, 24, and 25 have the same structure as the first operators 21 and 22 shown in FIG. 12.

The second operator 23 performs a multiplying operation of the complex number signal hx2 representing the channel characteristics of the second reception antenna and the received signal yhx1$r$ and a multiplying operation of the complex number signal hx2 and the received signal yhx1$i$. That is, the second operator 23 performs $h_{12}^*h_{11}+h_{22}^*h_{21}$ shown in Equation 10 for detecting $x_2$.

The second operator 24 performs a multiplying operation of the complex number signal hx2 representing the second channel characteristics of the reception antenna and the hx1$r$ representing the channel characteristics of the first reception antenna and a multiplying operation of the complex number signals hx2 and hx1$i$. That is, the second operator 24 performs $h_{12}^*h_{11}+h_{22}^*h_{21}$ shown in Equation 10 for detecting $x_2$.

The second operator 25 performs a multiplying operation of the complex number signal hx1$r$ representing the channel characteristics of the first reception antenna and the received signal yhx1$r$ and a multiplying operation of the complex number signal hx1$r$ and the received signal yhx1$i$. That is, the second operator 25 performs $h_{11}^*y_1+h_{21}^*y_2$ shown in Equation 15 for detecting $x_1$.

Meanwhile, the weight calculators 26 and 28 calculate modulation weighting according to a modulation method. More specifically, the weight calculator 26 calculates the modulation weighting on the basis of a result according to the multiplying operation of the channel characteristics of the second reception antenna outputted from the second operator 23, and the received signal and the weight calculator 28 calculates the modulation weighting on the basis of a result according to the channel characteristics of the first reception antenna outputted from the second operator 25 and the received signal.

The comparator 27 multiplies the signal constellation of the 1-quadrant by each transmission symbol of the received signal on the basis of the result of the multiplying operation according to the channel characteristics of the second reception antenna and the channel characteristics of the first reception antenna that are outputted from the second operator 24.

Figure 14:
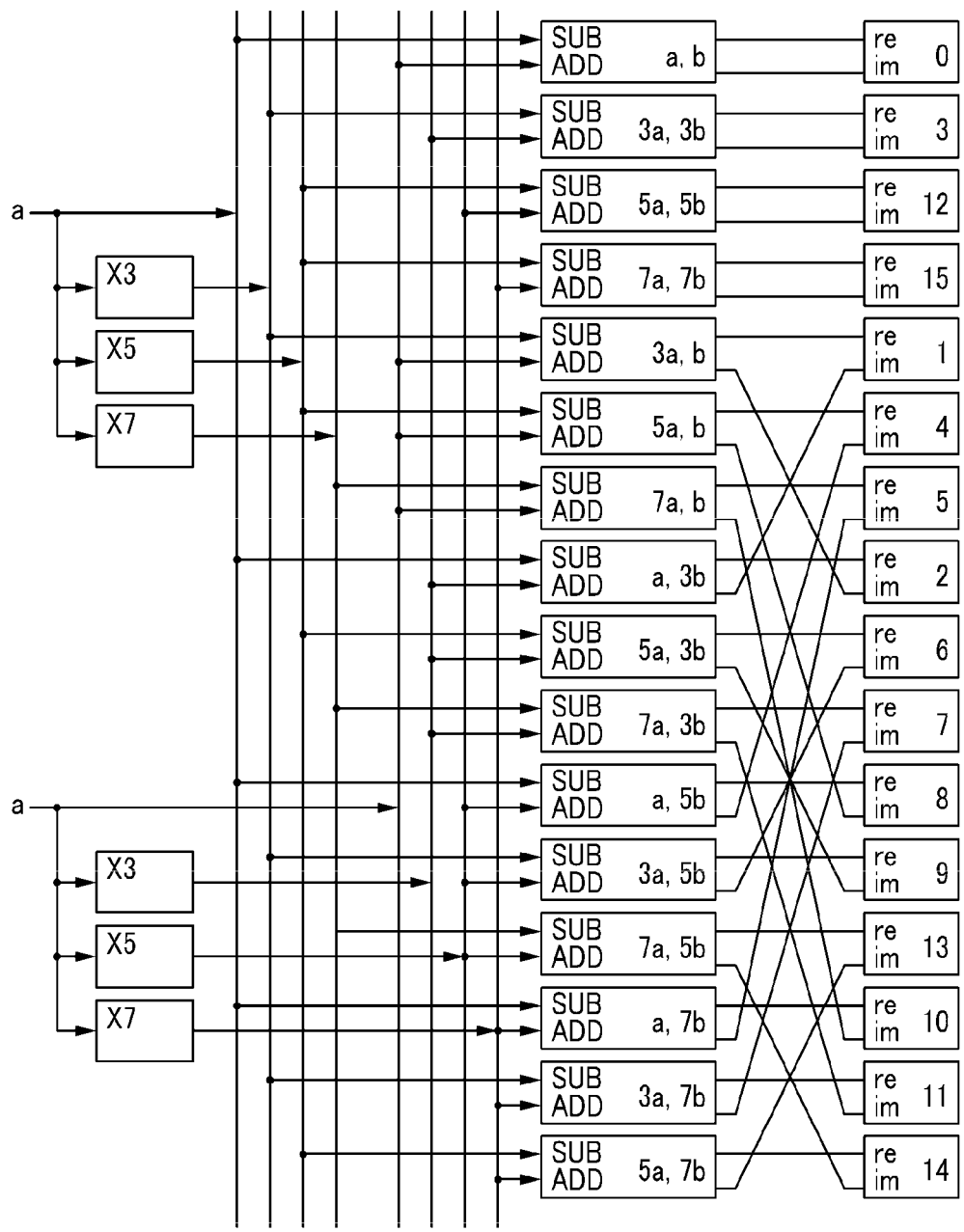
FIG. 14 is a diagram showing a configuration of a comparator according to an exemplary embodiment of the present invention.

FIG. 14 is a diagram showing a configuration of a comparator 27 according to an exemplary embodiment of the present invention, and FIG. 15 is a diagram illustrating a detailed configuration of blocks X3, X5, and X7 shown in FIG. 14. In the comparator 27 shown in FIG. 14, each multiplying and subtracting unit has the same structure as the structure shown in FIG. 13.

As described above, when $(h_{12}^*h_{11}+h_{22}^*h_{21})=a+jb$ in Equation 10, it can be understood that $(h_{11}^*h_{12}+h_{21}^*h_{22})=a-jb$ in Equation 15. Therefore, the comparator 27 acquires a signal constellation of the 1-quadrant representing all signals that can be generated with respect to each transmission symbol, and an operation result thereof is shown in FIG. 1.

Figure 16:
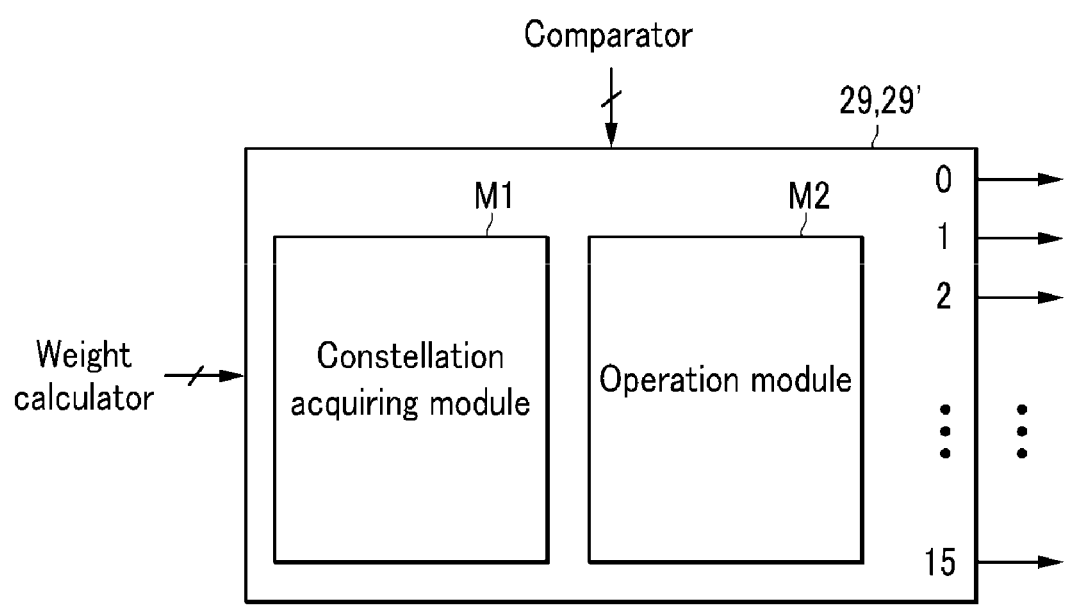
FIG. 16 is a diagram showing a configuration of a phase rotator according to an exemplary embodiment of the present invention.

FIG. 16 is a diagram showing configurations of phase rotators 29 and 29'.

The phase rotators 29 and 29' include a constellation acquiring module M1 that acquires the signal constellation for the remaining quadrants on the basis of the signal constellation of the 1-quadrant acquired for a predetermined transmission symbol transmitted from the comparator 27, and an operation module M2 that detects a transmission symbol candidate group by performing the operations shown in Equation 10 and Equation 15 on the basis of the signal constellations of the quadrant for each acquired transmission symbol.

The constellation acquiring module M1 rotates the acquired signal constellations of a predetermined quadrant at a set angle (i.e., 90 degrees), changes the sign, and switches a value of the real part into a value of the imaginary value to acquire the signal constellations for the remaining quadrants.

As shown in Equation 10 and Equation 15, the operation module M2 performs a subtracting operation on the basis of the acquired signal constellations of each quadrant, and performs a sliding operation on the basis of the result of the subtracting operation to acquire a symbol candidate group for each transmission symbol.

When the candidate group for each transmission symbol is acquired by the signal detector 20 having the structure described above, the metric calculators 30 and 40 calculate the metric for each acquired transmission symbol candidate group.

Figure 17:
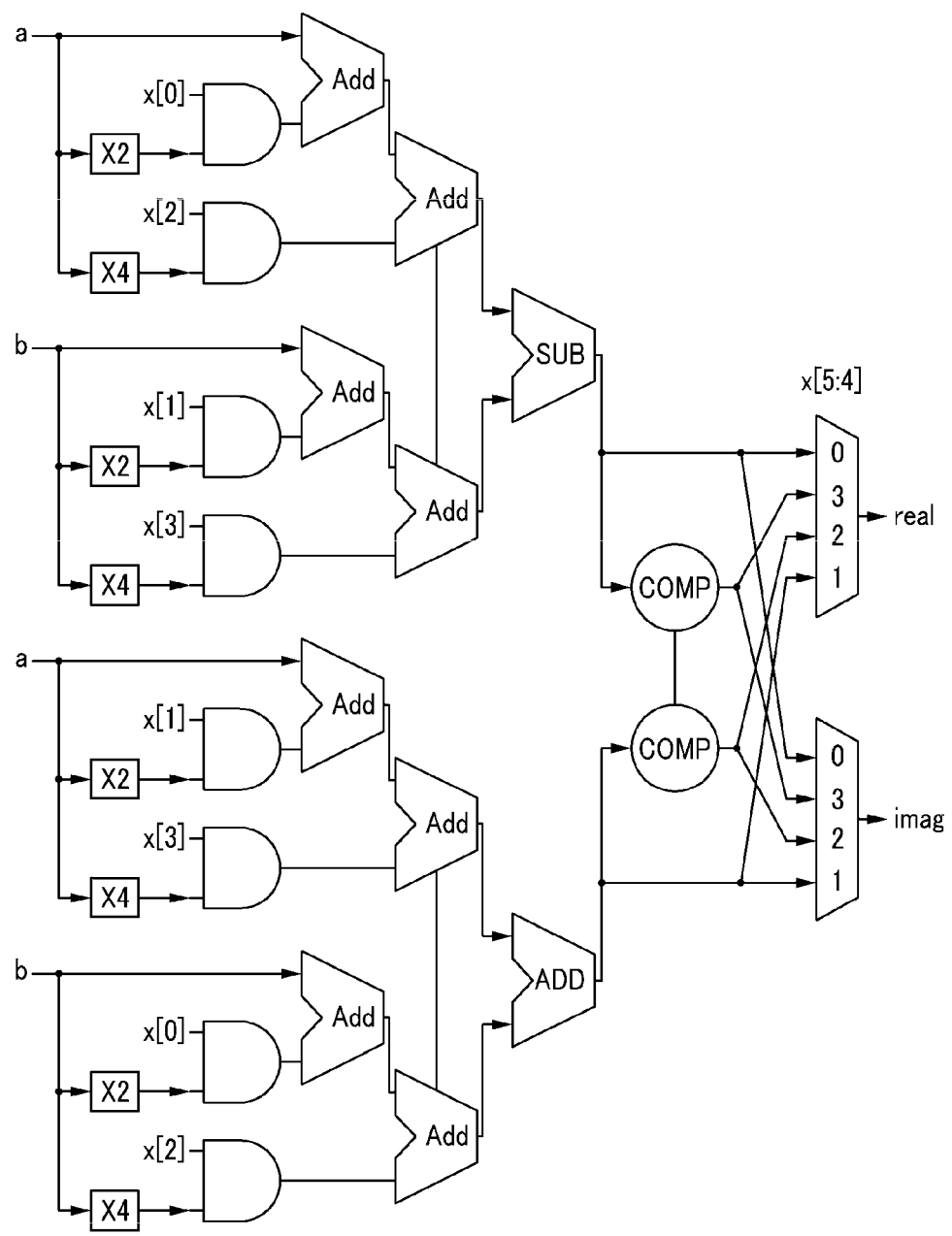
FIG. 17 is a configuration diagram of a metric calculator according to an exemplary embodiment of the present invention.

FIG. 17 is a configuration diagram of a metric calculator according to an exemplary embodiment of the present invention. Blocks X2 and X4 have the same structure as the block shown in FIG. 15 in FIG. 17.

The metric calculators 30 and 40 perform the multiplying operation for each transmission symbol candidate groups and thus calculate the metric for each symbol candidate on the basis of Equation 11, and more specifically, the metric calculator 30 calculates metrics for candidates of the transmission symbol $x_1$, respectively and the metric calculator 40 calculates metrics for candidates of the transmission symbol $x_2$, respectively. In FIG. 17, x[5:4] corresponds to phase rotation.

As described above, when the metrics for the candidates for each transmission symbol are acquired, the LLR generators 50 and 60 generate an LLR for soft decision on the basis of the acquired metrics. That is, the LLR generators 50 and 60 acquire the LLR for each bit on the basis of the metrics acquired with respect to the candidates for each bit constituting each transmission symbol. The LLR generator 50 acquires an LLR for each bit on the basis of the metrics calculated with respect to the detected candidates of the transmission symbol $x_1$, and the LLR generator 60 acquires an LLR for each bit on the basis of the metrics calculated with respect to the detected candidates of the transmission symbol $x_2$.

At the time of calculating the LLR, as described above, differences between values of (+) metrics and values of (−) metrics by the unit of the 1-quadrant are compared with each other, differences between the smallest values in the quadrants are detected, and the smallest value among the detected differences is set as the LLR of the corresponding bit. Herein, since the operation of comparing the metrics in the quadrants is repeated whenever the phase is rotated, the LLR generators 50 and 60 according to the exemplary embodiment of the present invention include the comparator for the comparison operation with respect to the 1-quadrant and may further include a module for phase-rotating the operation result of the comparator.

Next, a method for signal detection according to an exemplary embodiment of the present invention will be described on the basis of the apparatus having the above-mentioned structure.

Figure 18:
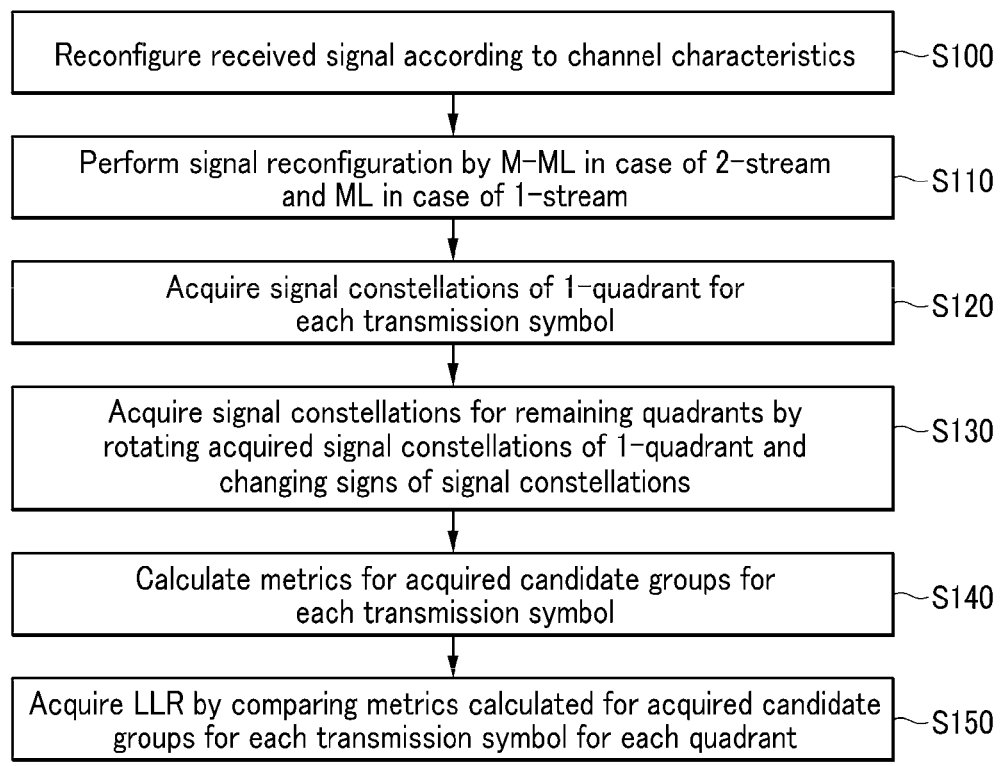
FIG. 18 is a flowchart of a method for signal detection according to an exemplary embodiment of the present invention.

FIG. 18 is a flowchart of a method for signal detection according to an exemplary embodiment of the present invention.

First, received signals that are received through a plurality of reception antennas and processed by baseband sample data are reconfigured on the basis of channel characteristics through an input processor 10 (S100). In particular, as described above, when 2-stream received signals are inputted, h1$x$_re, hx2, hx1_im, yhx1_re, and yhz1_im are outputted. Accordingly, when the 2-stream received signals are inputted, the transmission symbols $x_1$ and $x_2$ are detected according to Equation 10 and Equation 15, and the M-ML detection to calculate metrics for the transmission symbols is made according to Equation 11 as described above and while both transmission symbols $x_1$ and $x_2$ are operated.

On the contrary, when 1-stream received signals are inputted, no signal is received through a second antenna. Therefore, h1x_re, hx2, hx1_im, yhx1_re, and yhz1_im in which values of $h_{12}$ and $h_{22}$ are "0" are outputted. Accordingly, ML detection is performed in which a corresponding operation when the transmission symbol $x_2$ is not present in Equations 10 and 15 is performed and a corresponding metric when the transmission symbol $x_2$ is not present is calculated even in Equation 11.

As such, regardless of whether or not the 2-stream or 1-stream received signal is inputted, the corresponding signals are reconfigured on the basis of the channel characteristics, and are thereafter inputted and processed in a signal detector 20 and metric calculators 30 and 40, such that signal detection using M-ML and signal detection using ML are selectively performed through a signal detection apparatus 1 according to an exemplary embodiment of the present invention.

The signals reconfigured according to the channel characteristics are inputted into the signal detector 20, and the signal detector 20 detects a candidate group for each transmission symbol by processing the inputted signals. In particular, as described above, signal constellations of the 1-quadrant are acquired with respect to signals that can be generated for each transmission symbol (S120), and thereafter, signal constellations for the remaining quadrants are acquired by rotating the acquired signal constellations of the 1-quadrant by at set angle (90 degrees), changing the symbol, and switching a value of a real part into a value of an imaginary part, such that all signal constellations that can be generated for each transmission symbol are acquired (S130).

In addition, the metrics are calculated with respect to the acquired candidate groups for each transmission symbol, respectively (S140), and the LLR is generated by comparing the calculated metrics with each other. In particular, on the basis of the metrics for signal constellations for bits of the acquired candidate group for each transmission symbol, as described above, differences between the values of the metrics are compared with each other by the unit of the 1-quadrant, differences between the smallest values in the quadrants are detected, and the smallest value among the detected differences is set as the LLR of the corresponding bit (S150).

According to an embodiment of the present invention, in an MIMO communication system, it is possible to efficiently detect a signal by using ML and M-ML methods in a simpler method.

Further, it is possible to provide an apparatus that performs signal detection using ML and M-ML methods and inter-organically connects an LLR generation means related thereto. In particular, the apparatus can be implemented in a simplified design structure and as a result, it is possible to reduce power consumption in designing a multiple antenna system and improve efficiency in the design structure.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for signal detection in a multi-input multi-output communication system receiving signals transmitted through a plurality of transmission antennas by using a plurality of reception antennas, comprising:

reconfiguring the signals received through the plurality of the reception antennas on the basis of channel characteristics;

acquiring candidate groups for each transmission symbol by acquiring a signal constellation of one quadrant with respect to signals that can be generated for each transmission symbol and signal constellations for a plurality of remaining quadrants on the basis of the reconfigured signals;

calculating metrics for the acquired candidate groups for each transmission symbol; and generating a log likelihood ratio (LLR) for signals constituting the acquired candidate groups for each transmission symbol on the basis of the calculated metrics of the acquired candidate groups for each transmission symbol.

2. The method of claim 1, wherein the acquiring of the candidate groups for each transmission symbol includes:

rotating the acquired signal constellations of one quadrant for the signals that can be generated for each transmission symbol at a predetermined angle;

changing signs of the rotated signal constellations; and acquiring the signal constellations of the plurality of the remaining quadrants by switching a real part of the signal constellations having the changed sign into an imaginary part and switching the imaginary part of the signal constellation having the changed sign into the real part.

3. The method of claim 1, wherein the generating of the LLR includes:

comparing differences between values of the calculated metrics with each other by a unit of one quadrant with respect to the signal constellations for the signals constituting the acquired candidate groups for each transmission symbol; and detecting a difference having a smallest value in each quadrant and setting a smallest value among the detected differences as an LLR of a corresponding signal.

4. The method of claim 3, wherein the setting of the smallest value as the LLR of the corresponding signal includes:

selecting a first difference value having the smaller value between a difference value having a smallest value in a first quadrant and a difference value having a smallest value in a second quadrant;

selecting a second difference value having a smaller value between the selected first difference value and a difference value having a smallest value in a third quadrant;

selecting a third difference value having a smaller value between the selected second difference value and a difference value having a smallest value in a fourth quadrant; and setting the selected third difference value as the LLR of the corresponding signal.

5. The method of claim 1, wherein the reconfiguring of the signals received through the plurality of the reception antennas on the basis of the channel characteristics includes:

performing signal reconfiguration so as to detect a signal on the basis of a modified-maximum likelihood (M-ML) when the plurality of the reception antennas include two reception antennas, and 2-stream received signals are inputted; and performing signal reconfiguration so as to detect the signal on the basis of a maximum likelihood (ML) when the plurality of the reception antennas includes one reception antenna, and 1-stream received signals are inputted.

6. A method for signal detection in a multi-input multi-output communication system receiving signals transmitted through a plurality of transmission antennas by using a plurality of reception antennas, comprising:
reconfiguring the signals received through the plurality of the reception antennas on the basis of channel characteristics;
acquiring a signal constellation of one quadrant with respect to signals that can be generated for each transmission symbol on the basis of the reconfigured signals;
acquiring signal constellations of a plurality of remaining quadrants by individually rotating the signal constellation of the one quadrant by a set angle several times; and
acquiring candidate groups for each transmission symbol on the basis of the acquired signal constellations of the one quadrant and the plurality of the remaining quadrants.

7. The method of claim 6, wherein the acquiring of the signal constellations of the plurality of the remaining quadrants includes:
changing signs of the rotated signal constellations; and
acquiring the signal constellations of the plurality of the remaining quadrants by switching a real part of the signal constellations having the changed sign into an imaginary part and switching the imaginary part of the signal constellations having the changed sign into the real part.

8. The method of claim 6, wherein the reconfiguring of the signals received through the plurality of the reception antennas on the basis of the channel characteristics includes:
performing signal reconfiguration so as to detect a signal on the basis of a modified-maximum likelihood (M-ML) when the plurality of the reception antennas includes two reception antennas, and 2-stream received signals are inputted; and
performing signal reconfiguration so as to detect the signal on the basis of a maximum likelihood (ML) when the plurality of the reception antennas include one reception antenna, and 1-stream received signals are inputted.

9. An apparatus for signal detection in a multi-input multi-output communication system receiving signals transmitted through a plurality of transmission antennas by using a plurality of reception antennas, comprising:
an input processor reconfiguring the signals received through the plurality of the reception antennas on the basis of channel characteristics;
a signal detector acquiring candidate groups for each transmission symbol by acquiring a signal constellation of one quadrant with respect to signals that can be generated for each transmission symbol and signal constellations for a plurality of remaining quadrants on the basis of the reconfigured signals;
a metric calculator calculating metrics for the acquired candidate groups for each transmission symbol; and
an LLR generator generating a log likelihood ratio (LLR) for signals constituting at least one of the acquired candidate groups for each transmission symbol on the basis of the calculated metrics of the acquired candidate groups for each transmission symbol.

10. The apparatus of claim 9, wherein the signal detector includes:
a phase rotator acquiring the signal constellations for the plurality of the remaining quadrants by rotating the acquired signal constellations for the one quadrant by a predetermined angle, changing signs of the signal constellations, and switching a value of a real part into a value of an imaginary part.

11. The apparatus of claim 10, wherein the signal detector further includes:
a plurality of first operators performing a multiplying operation of complex number signals representing channel characteristics of one reception antenna;
a second operator outputting a first operation result by multiplying the complex number signals representing the channel characteristics of the one reception antenna by complex number signals representing channel characteristics of another reception antenna and outputting a second operation result by multiplying the complex number signals representing the channel characteristics of the plurality of the reception antennas by the received signals according to the channel characteristics;
a weight calculator calculating a modulation weighting according to a modulation method and applying the calculated modulation weighting to the second operation result outputted from the second operator; and
a comparator generating the signal constellation of the one quadrant for signals generatable with respect to each transmission symbol of the received signals on the basis of the first operation result outputted from the second operator and providing the generated signal constellations to the phase rotator.

12. The apparatus of claim 11, wherein each of the plurality of the first operators includes:
a multiplier multiplying the complex number signals;
a register outputting a predetermined value inputted in accordance with an applied enable signal;
an adding and subtracting unit outputting values acquired by performing an adding or subtracting operation by setting the predetermined value from the register as a real part and an output value of the multiplier as an imaginary part; and
a register outputting the outputted values of the adding and subtracting unit in accordance with the applied enable signal.

13. The apparatus of claim 10, wherein the LLR generator that compares, for each quadrant, differences between values of (+) metrics and values of (−) metrics, detects differences having a smallest value, and sets a smallest value among the detected differences as an LLR of the corresponding signal on the basis of metrics for four quadrants of signals constituting an acquired candidate group for a corresponding transmission symbol.

* * * * *